May 23, 1967     J. A. RIGNEY ET AL     3,321,545
OLEFINS BY HYDROGEN TRANSFER
Filed June 30, 1964
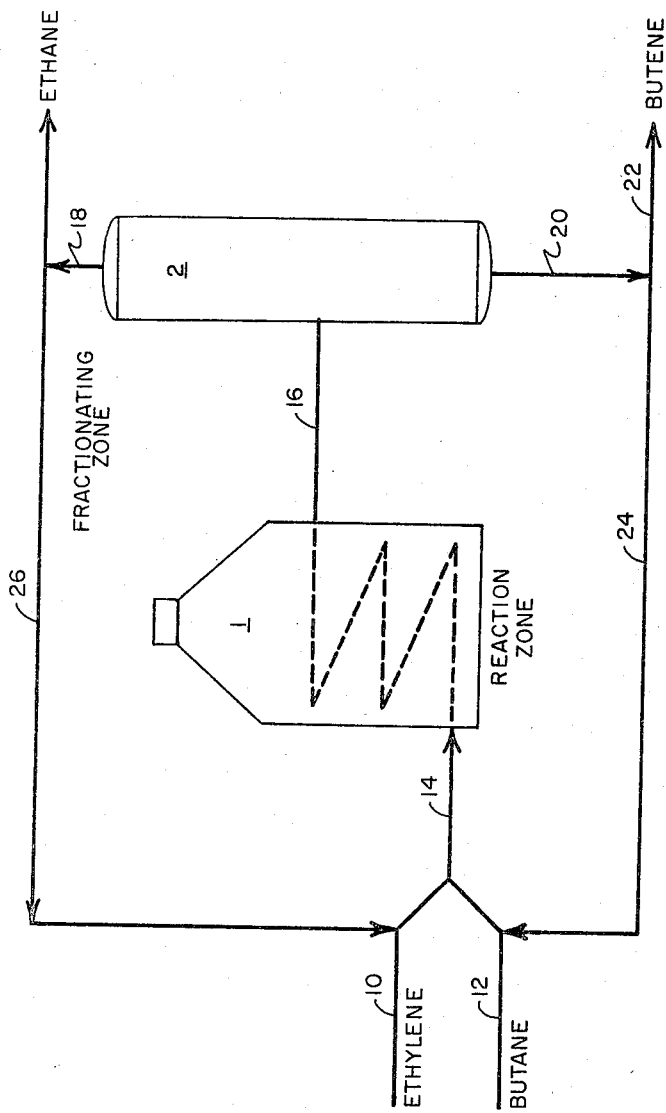
JAMES ARTHUR RIGNEY
CLYDE LEE ALDRIDGE    INVENTORS
BY C B Barris
PATENT ATTORNEY

United States Patent Office 3,321,545
Patented May 23, 1967

3,321,545
OLEFINS BY HYDROGEN TRANSFER
James Arthur Rigney, Baton Rouge, La., and Clyde Lee Aldridge, Rouen, Seine-Maritime, France, assignors to Esso Research and Engineering Company, a corporation of Delaware
Filed June 30, 1964, Ser. No. 379,287
12 Claims. (Cl. 260—683.9)

The present invention relates to an improved catalytic process for the transfer of combined hydrogen from one type of hydrocarbon to another type of hydrocarbon. More particularly, the present invention relates to a process of converting a hydrocarbon having at least three carbon atoms per molecule and containing non-aromatic carbon-to-hydrogen bonds to a different hydrocarbon having a different carbon-to-carbon linkage and a higher carbon-to-hydrogen ratio by interaction with a hydrogen accepting olefin in the presence of a certain pretreated catalyst.

It has been found that the conversion of a hydrocarbon having at least three carbon atoms per molecule can be effected by adding to the charged hydrocarbon a substantial amount of a hydrogen accepting olefin in the presence of a catalyst as hereinlater described. Said olefin ultimately is converted to a saturated hydrocarbon by addition of the hydrogen removed from the charge hydrocarbon while the latter is converted in the process to a compound having a higher carbon-to-hydrogen ratio. Thus, it has been found that it is possible to effect an almost quantitative transfer of hydrogen from paraffins or relatively more saturated charge material to hydrogen accepting olefins so that the olefins become saturated; and, in effect, their unsaturation is transferred to the compounds of higher saturation to yield material more olefinic in nature. The type of reactions with which the present process is concerned is exemplified by the two following equations which show the interaction of ethylene with 3 to 4 carbon atom paraffin hydrocarbons respectively, whereby ethane and 3 and 4 carbon atom olefins are produced.

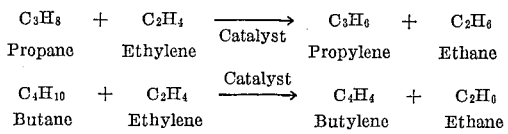

The process of the above equations has wide application in a conversion of various types of hydrocarbons to related hydrocarbons having at least one different carbon-to-carbon linkage and a higher carbon-to-hydrogen ratio. Therefore, alkanes of at least 3 carbon atoms can be dehydrogenated to alkenes and possibly alka dienes. The progress of the process set forth in the above equations depends largely upon the preferential affinity of ethylene for hydrogen in the presence of the preferred catalyst of this invention. The types of catalysts which may be employed for promoting the extent of the above equations are certain of those which have been found to be effective in the so-called dehydrogenation reactions. In other words, such catalysts have value in promoting the splitting off of a molecule of hydrogen from the paraffin to produce the corresponding olefin and it has also been determined that some of the same catalytic materials are particularly effective in transferring hydrogen from paraffins to ethylene, the ethylene acting as an acceptor of the released hydrogen and thus enabling the reactions to proceed rapidly to equilibrium.

The catalysts preferably used in accordance with the known process consist, as mentioned, of a catalyst or catalysts of the hydrogenation-dehydrogenation variety such as molybdenum, tungsten, vanadium, chromium, cobalt, nickel, iron, and tin and the oxides and sulfides thereof. Mixtures of these materials or compounds of two or more of these oxides and sulfides can be advantageously employed.

These catalysts are advantageously deposited on or otherwise composited with a porous carrier such as activated alumina or other various synthetic or natural silica-alumina cracking type catalysts or other materials having a large surface area such as activated carbon. The composite catalyst and carrier is prepared in a known manner, such as, by impregnating the carrier particles with the solution of a compound or salt of the desired composition followed by calcining and reduction if a reduced catalyst is to be used. The composite may also be prepared by co-precipitation to form a gel by mixing metal sulfates and/or nitrates with alkaline silicates and or aluminates. The size of the catalyst can vary from a microspherical powder up to ¼-inch pellets or larger. The preferred catalysts comprise an alumina carrier plus oxides of chromium, molybdenum, and vanadium.

In suitably applying the process to the production of olefins, for example, propene and butene, it is found only to be necessary to pass proportioned mixtures of propane or butanes with ethylene through beds of selected granular catalytic material which is contained in treating chambers as filler. It has been surprisingly found, however, that relatively low temperatures, i.e., temperatures of from 500 to 1000° F., can be successfully employed, depending upon the efficacy of the particular catalyst used, with atmospheric or moderately super-atmospheric pressures usually being employed.

While the foregoing process offers the practical application of a type of reaction involving catalysts in the transfer of combined hydrogen from one type of hydrocarbon to another, certain inherent faults have been found in each process. For example, during the transfer of hydrogen from a relatively more saturated hydrocarbon to the olefinic hydrogen acceptor, side reactions have been found to occur which result in lower conversion to the desired olefins and higher consumption of olefinic hydrogen acceptor than is required by the olefins produced. One of these undesirable side reactions has been found to involve a disproportionation of the hydrogen acceptor resulting in methane formation and coke deposition on the surface of the catalyst utilized. Furthermore, while reaction temperatures of 800° F. and less are usually desired in order to minimize cracking and possible aromatization of any $C_6$ plus hydrocarbons employed, it is found that undesirable methane formation of from about 5 to 12% of the ethylene in the feed still remains fairly constant over long periods of time at this temperature.

It is an object of this invention, therefore, to provide an improved process for the conversion of hydrocarbons containing at least three carbon atoms and containing non-aromatic carbon-to-hydrogen bonds to different hydrocarbons having a different carbon-to-carbon linkage and the higher carbon-to-hydrogen ratio. Another object is to provide an improved process for the formation of one or more new or different carbon-to-carbon bonds between contiguous carbon atoms in a given molecule to produce an olefinic bond without undesirable side reactions. These objects will be more fully understood and other objects will become apparent from the description of the invention which follows.

In accordance with the present invention it has been found that the above desired objects are obtained by pretreating the catalyst, substantially immediately prior to use, at temperatures in excess of 850° F. and preferably between 900 and 950° F. with a lower olefin, preferably ethylene or propylene, prior to use of said catalysts.

The process of the present invention has wide application to the conversion of various types of hydrocarbons to the related hydrocarbons having at least one different carbon-to-carbon linkage and a higher carbon-to-hydrogen ratio. The upper limit of the number of carbon atoms present in the hydrocarbon is determined only by the operational feasibility thereof. Thus, the present invention is applicable to both polymeric hydrocarbons as well as monomeric hydrocarbons. With regard to the monomeric hydrocarbons, it is found that any acyclic aliphatic hydrocarbon can be suitably employed, the upper limit of the number of carbon atoms again being determined only by the operational feasibility thereof, but with the preferred upper limit being about 30 carbon atoms. While the aliphatic hydrocarbon employed may be essentially saturated in nature in order to operate, it is found that the feed employed may comprise saturated acyclic aliphatic hydrocarbons mixed with minor amounts of unsaturated acyclic aliphatic hydrocarbons. Thus, alkanes of at least three carbon atoms can be dehydrogenated to alkenes and/or alkadienes, for example, isobutane can be dehydrogenated to isobutene, n-butane to butene-1, butene-2 and butadiene-1-3, and n-pentane to corresponding pentenes and pentadienes. In addition, as mentioned, mixtures of alkanes and minor amounts of alkenes can also be dehydrogenated, for example, n-butane when mixed with minor amounts of butene-1 and/or -2 can be dehydrogenated to butene-1, butene-2 and butadiene-1-3. As will be noted herein, the aliphatic hydrocarbon is converted to one having a higher carbon to hydrogen ratio but containing the same number of carbon atoms as the starting aliphatic hydrocarbon.

In accordance with the present invention, ethylene is the preferred hydrogen accepting olefin for use in the process thereof. For convenience of terminology, the term "hydrogen accepting olefin" is employed herein to designate an olefin suitable for accepting hydrogen in a conversion of a particular compound as determined by application of the theory of free energy changes. Thermodynamically, ethylene is the most suitable one because at any given temperature the free energy change of the conversion of ethylene to ethane is a lower positive or greater negative number than for the corresponding conversion of any other olefin. Ethylene has further considerable advantages for use in the present invention in that it and its hydrogenation product ethane are less subject to cracking than the olefins of higher molecular weight. Similarly, ethylene is less subject to ready conversion, or any other reaction, in the presence of catalysts than higher molecular weight olefins which may be converted to more highly unsaturated compounds by reaction in the presence of the foregoing catalysts and under the reaction conditions normally employed.

Propylene is also a suitable olefin for use in many reactions in accordance with the present invention, particularly when a compound desired is a hydrocarbon having a relatively greater number of carbon atoms, e.g., six or more carbon atoms. The free energy change for propylene is about four kilocalories greater, i.e., more positive than for ethylene at temperatures in the range employed in the present invention. Next to ethylene, propylene is preferably employed, but any other olefin such as butene-1, butene-2, isobutene, and normal or branched pentene, hexene, or higher olefin may be employed always provided that it meets the criterion of an acceptable free energy change.

The olefin employed as hydrogen acceptor need not be charged in pure form. Mixtures of olefins, for example a mixed ethylene-propylene stream may, therefore, be employed. The olefin may also be charged in admixture with hydrocarbons which are relatively inert under reaction conditions, e.g., ethylene may be charged in admixture with methane and/or ethane. Since the effectiveness of the olefin as hydrogen acceptor depends on equilibrium between the olefin and the corresponding paraffin, the presence of the corresponding paraffin in the feed will tend to suppress this reaction and such paraffin is therefore preferably held to a relatively low concentration in the olefin charged stream. The olefin employed as hydrogen acceptor in the present process may be derived from any convenient source, e.g. thermal and catalytic cracking of petroleum hydrocarbons furnishes large amounts of olefins in most petroleum refineries. Ethylene may be recovered from cracking gases or may be produced and recovered by any of numerous known processes.

The conditions of carrying out the conversion step of this invention depend on the particular compound to be converted, the compound selected as hydrogen accepting olefin, the catalyst employed, as well as the hydrocarbon desired to be obtained as principal product. In the conversion of saturated hydrocarbons to their corresponding olefins, the temperature required is generally between at least 500° F. and 1000° F. and preferably in the range between 600° F. and 900° F. although higher temperatures may be utilized. The higher temperatures are not objectionable as long as other undesirable changes are not effected. However, excessively high temperatures are not required in order to effect suitable dehydrogenation in the presence of a catalyst utilized and the hydrogen accepting olefin. The process is suitably carried out at various pressures of from subatmospheric to superatmospheric pressures, in either the liquid or the vapor phase, depending on the particular hydrocarbon being employed, i.e. the lower molecular weight feeds, e.g. $C_3$–$C_{16}$ alkanes being more suitably reacted in the vapor phase. Although atmospheric pressure is suitable and is advantageous in most cases, other considerations, such as factors which are involved in the separation and recovery of the hydrocarbon products from the reactor effluent stream, make superatmospheric pressure most desirable in some cases. Thus, the pressure can be at any value at which reactants are sufficiently heated to a temperature at which the hydrocarbon is substantially thermally stable. The pressure employed is preferably in the range of between 1 and 12 atmospheres, but may be as high as 30 atmospheres.

The residence time of the reactants at the selected reaction conditions also depends on the particular hydrocarbon reactant, the hydrogen accepting olefin in reaction mixture, the catalyst utilized, the temperature and pressure employed, and the nature of the dehydrogenation product. In general, it should be at least about 3 seconds and usually it should not be over about 300 minutes. With most common reactants, dehydrogenation is very rapid so that a residence time of from 5 to 20 seconds suffices and is therefore preferred.

The ratio of hydrogen accepting olefins to hydrocarbons to be converted in the present reaction, which may be designated as "hydrogen donor hydrocarbons" may be varied over a wide range. This ratio may be expressed by the ratio of mole percent of the hydrogen accepting olefin to the mole percent of hydrogen donor. The mole ratio of hydrogen accepting olefin to hydrogen donor employed may suitably vary from 0.15 to 1.5 and is preferably in a range between 0.25 and 0.55. In selecting a ratio of hydrogen accepting olefin to hydrogen donor it is generally preferred not to exceed a mole ratio of olefin to donor of about 1.0.

It is the feature of the present invention that the catalyst utilized is treated at relatively high temperatures and moderately superatmospheric pressures with a normally gaseous substantially olefinic hydrocarbon material containing predominantly two to three carbon atoms. This fraction which is used to treat the catalyst prior to use of said catalyst is preferably introduced immediately before the stream of reactants has transversed a portion of the catalyst mass. This is predicated solely as a matter of convenience, e.g. due to the availability of the treating fraction, necessity of heating the zone, etc. It is within the ambit of this invention, however, to treat the catalyst in the reaction zone, but at a time long before its use as a catalyst, e.g. days or weeks, or to pretreat the catalyst prior to its placement in the zone. The temperatures utilized for the pretreatment of the catalyst are suitably in excess of 850° F. and preferably are between 900 and 950° F. The contact time for the pretreatment of the catalyst is suitably between 5 and 180 minutes and preferably is between 45 and 75 minutes. It is found that suitable flow rates of the catalyst treating fraction in a catalyst treatment zone will be in the range of from 50 to 700 v./v./hr. and preferably is in the range of between 150 and 500 v./v./hr. based on the above time periods. In the practical operation of the present invention, time, temperature, flow rate, etc. relationships may be relied on to determine the amount and location of the injection of the pretreating olefinic stream. As hereinbefore mentioned, such pretreatment is effective in the substantial inhibition of undesirable side effects. This inhibition is of long duration and is found to exist not only at the higher temperatures utilized in the olefin transfer reaction, but more important is found to exist at temperatures of 800° F. and less which are the most desirable temperatures for the preparation of high molecular weight olefins by hydrogen transfer.

The process of the present invention will be illustrated by means of the accompanying drawing which shows a schematic flow scheme of one embodiment of operating said process. For the sake of illustration, butane is assumed to be converted essentially into butene by reaction in the vapor phase in the presence of ethylene as the hydrogen accepting olefin. In accordance with the present invention, ethylene is first introduced through lines 10 and 14 to reactor 1 from an outside source, not shown. Reaction zone 1 may be a heated vessel or coil which is maintained at a temperature in the range of 900 and 950° F. during the ethylene pretreatment which lasts for a period of from 5 to 180 minutes so as to effect the desired catalyst contact time. The flow rate of ethylene during this pretreatment period is about 250 v./v./hr. After the pretreatment is accomplished, reactor temperature is changed to the desired level and butane is charged through line 12 and 14 to reactor 1 from an outside source, not shown, and the ethylene is continuously added via lines 10 and 14 to reactor 1. The combined feed is added to the reactor 1, preferably at a gas flow rate of about 150 v./v./hr. The feed of ethylene and butane is so adjusted that the feed comprises about 30 mole percent of ethylene and about 70 mole percent of butane. The mixture of butane and ethylene in line 14 may be preheated, if desired, by separate equipment, not shown, prior to its introduction into reaction zone 1. Reactor 1 is maintained at a temperature in the range between 500 and 1000° F. during the reaction involving hydrogen transfer. The stream of ethylene and butane is maintained in the reactor for a period of from 10 to 20 seconds whereafter the reactor effluent is withdrawn through line 16 and is then passed to fractionator 2. Prior to entering fractionator 2, the mixture may be cooled by indirect heat exchange in a heat exchanger, not shown, in line 16. Fractionating zone 2 may advantageously comprise several fractionating columns arranged in accordance with well known principles of fractional distillation. The materials introduced thereto are fractionally distilled so as to recover desired fractions, shown diagrammatically as leaving through lines 18 and 20 in the respective order of their boiling ranges. Through line 18 is withdrawn minute quantities of methane and hydrogen formed during reaction, as well as the ethane resulting from the hydrogen transfer and any unreacted ethylene. The total hydrocarbon product is withdrawn through line 20 for further workup via line 22, including separation of unconverted butane from the reaction products. The butane, so separated, may be recycled to line 12 via line 24.

If desired, effluent stream 18, withdrawn from fractionator 2 as overhead, may be separated into streams comprising ethane and ethylene respectively. The ethylene, so separated, may be recycled to line 10 for further use in the process by means of line 26. The ethane stream, line 28, may be discarded from the system or it may be processed for reuse by introduction into a cracking zone, not shown, which is operated at a temperature of approximately 1500° F., with a very short residence time to produce a mixture of ethane and ethylene. The ethylene, so produced, may also, if desired, be recycled back to the system for further use.

In the drawing and description of the process, much necessary auxiliary equipment, such as valves, pumps, heat exchangers, and the like, has not been shown in order to simplify presentation of the process. The location of such equipment will be apparent to those skilled in the art. The description of the process as given above in connection with the drawing is for illustrative purposes only and is not to be considered a limitation of the process of the present invention. Different methods of recovering reactant effluent and separating the reaction products therefrom may be employed.

The invention will be further illustrated by means of the following illustrative examples.

*Example I*

In order to show the efficacy of catalyst pretreatment, the following comparative data were obtained employing gas flow rates of 150 v./v./hr. and using a feed blend comprising 41 mole percent of ethylene and 59 mole percent of propane. The feed was contacted in a reactor containing a catalyst consisting essentially of 13.8% $Cr_2O_3$ on alumina at temperatures of 800° F. and atmospheric pressure. One run employed a catalyst material which was pretreated with ethylene at a temperature of 900° F. for a period of 40 minutes. Comparative data are presented below in tabular form. Table I illustrates the difference in resulting undesirable methane produced both before pretreatment and after pretreatment, as well as the amount of propylene product in the feed both before pretreatment and after pretreatment.

TABLE I

| | Before Pretreatment | After 900° F. Pretreatment |
|---|---|---|
| $CH_4$ in Product (mole percent on feed $C_2H_4$) | 12 | 0 |
| $C_3$ Olefin in Product (mole percent on feed $C_3H_8$) | 26 | 30 |

*Example II*

Further comparative data were obtained from a series of runs effected in a manner similar to those of Example I. The runs illustrated in Example II employed a catalyst, however, composed of 10% $Cr_2O_3$ and 10% zinc oxide on alumina. This catalyst was employed in order to illustrate that even with the use of this catalyst, which is notable as one having great tendencies to form methane during the hydrogen transfer, by the use of pretreatment, this tendency was inhibited completely. The data comparable to Example I are produced below in tabular form.

TABLE II

| | Before Pretreatment | After 900° F. Pretreatment |
|---|---|---|
| $CH_4$ in Product (mole percent on feed $C_2H_4$) | 24 | 0 |
| $C_3$ Olefin in Product (mole percent on feed $C_3H_8$) | 10 | 22 |

The foregoing data not only show that the methane formation was completely inhibited by the pretreatment step, but in addition, amply illustrate the increased conversions which were obtained by the technique of the present invention.

Example III

Another series of runs was effected in order to illustrate stability of the catalyst after the pretreatment with ethylene. In this series of runs, a catalyst similar to the catalyst employed in Example I was utilized, i.e., 13.8% $Cr_2O_3$ on alumina. The feed rate and the feed composition were also similar to that employed in Example I. The data are presented below in tabular form.

TABLE III

| | Before Pretreatment | | | | | Before 900° F. Pretreatment | | | | |
|---|---|---|---|---|---|---|---|---|---|---|
| Time Elapsed, hrs | 1 | 2 | 3 | 4 | 5 | 1 | 2 | 3 | 4 | 5 |
| $CH_4$ in Product (Mole percent on Feed $C_2H_4$) | 12 | 12 | 11 | 12 | 11 | 0 | 0 | 0 | 0 | 0 |

From said data, it is apparent that the undesirable methane produced remained at a constant level for more than 5 hours during the reaction effected without catalyst pretreatment. On the otherhand, after the pretreatment with ethylene at 900° F. was effected, no methane was formed for an additional period of 5 hours.

It will be obvious to those skilled in the art that various changes and modifications may be made in the process hereinabove described without departing from the scope of the invention as defined in the appended claims and it is intended therefore that all matter contained in the foregoing description shall be interpreted as illustrative only and not in a limiting sense.

Example IV

A series of runs were effected in order to illustrate the use of different paraffinic starting material. In this example a catalyst similar to the catalyst employed in Example I was utilized, i.e., 13.8% $Cr_2O_3$ on alumina. The feed comprised ethylene and isopentane in a molar ratio of 34/66; the feed rate was 150 v./v./hr.; and the temperature was 800° F. The data resulting from a comparison of non-pretreatment with pretreatment are presented below in tabular form.

TABLE IV

| | Before Pretreatment | After 900° F. Pretreatment |
|---|---|---|
| $CH_4$ in Product (Mole percent on Feed $C_2H_4$) | 10 | 0 |
| $C_5$ Olefin in Product (Mole percent on Feed $C_5H_{12}$) | 4 | 25 |

What is claimed is:

1. In a process comprising reacting an aliphatic hydrocarbon containing more than three carbon atoms with a hydrogen accepting olefin having a lower carbon atom content in the presence of a catalyst effective in transferring hydrogen from the hydrocarbon to the olefin thereby forming an alkane corresponding to said olefin and an aliphatic olefin of more than three carbon atoms but containing the same number of carbon atoms as the starting aliphatic hydrocarbon, the improvement which comprises pretreating said catalyst by contact with a treating olefin having from 2 to 3 carbon atoms at a temperature of over 850° F. for a period of time of from 5 to 180 minutes.

2. The process of claim 1 in which the catalyst comprises alumina supporting an oxygen containing compound of chromium.

3. The process of claim 1 in which the catalyst comprises a sulfide containing compound of molybdenum.

4. The process of claim 1 in which the treating olefin is ethylene.

5. In the process for converting a first aliphatic hydrocarbon containing at least three carbon atoms per molecule and containing non-aromatic carbon-to-hydrogen bonds into at least a second aliphatic hydrocarbon having a higher carbon-to-carbon hydrogen ratio but containing the same number of carbon atoms as said first hydrocarbon which comprises contacting a mixture comprising said first hydrocarbon with a hydrogen accepting olefin having a lower carbon number than said first hydrocarbon in a reaction zone in the presence of a dehydrogenation catalyst and at a temperature of about 500 to 1000° F. to effect a carbon-to-hydrogen bond cleavage in said first hydrocarbon and conversion of at least part of said olefin to the corresponding paraffin and recovering said second hydrocarbon, the improvement which comprises pretreating said catalyst with a catalyst treating olefin having from 2 to 3 carbon atoms at a temperature of from 900 to 950° F. for a period of from 5 to 180 minutes.

6. The process of claim 5 in which the hydrocarbon accepting olefin is ethylene.

7. The process of claim 5 in which the catalyst is pretreated in said reaction zone substantially immediately prior to use in said conversion process.

8. The process of claim 7 in which the catalyst treating olefin is introduced into said reaction zone at a flow rate of from 50 to 700 v./v./hr.

9. In a process comprising reacting an aliphatic hydrocarbon containing more than three carbon atoms with a hydrogen accepting olefin consisting essentially of ethylene in the presence of a catalyst effective in transferring hydrogen from said aliphatic hydrocarbon to the ethylene thereby forming ethane and an olefin of more than three carbon atoms but containing the same number of carbon atoms as said starting aliphatic hydrocarbon, the improvement which comprises treating said catalyst with ethylene at a temperature of over 900° F. for a period of time of from 5 to 180 minutes.

10. The process as defined in claim 9 in which the catalyst comprises alumina supporting an oxygen containing compound of chromium.

11. The process of claim 9 in which the catalyst comprises a sulfide containing compound of molybdenum.

12. In the process for converting a first aliphatic hydrocarbon containing from 3 to about 16 carbon atoms per molecule and containing non-aromatic carbon-to-hydrogen bonds into at least a second aliphatic hydrocarbon having a higher carbon-to-hydrogen ratio but containing the same number of carbon atoms as said first hydrocarbon which comprises contacting a vapor mixture comprising said first hydrocarbon with ethylene in a reaction zone, in the presence of a dehydrogenation catalyst and at a temperature of about 500 to 1000° F. to effect a carbon-to-hydrogen bond cleavage in said first hydrocarbon and conversion of at least part of said ethylene to ethane and recovering said second hydrocarbon, the improvement which comprises pretreating said catalyst while in said reaction zone with ethylene introduced at a flow rate of from 150 to 500 v./v./hr., at a temperature of from 900 to 950° F. and for a period of from 45 to 75 minutes, substantially immediately prior to use in said conversion process.

References Cited by the Examiner
UNITED STATES PATENTS

| 2,426,870 | 9/1947 | Hill | 260—683.9 |
| 2,626,233 | 1/1953 | Kimberlin et al. | 208—145 |
| 2,880,249 | 3/1959 | Raley et al. | 260—683.3 |

DELBERT E. GANTZ, *Primary Examiner.*

S. P. JONES, *Assistant Examiner.*